(12) United States Patent
Rostoker

(10) Patent No.: US 6,537,003 B1
(45) Date of Patent: Mar. 25, 2003

(54) LOAD RESTRAINT SYSTEM AND METHOD

(76) Inventor: Michael David Rostoker, 108 McPherson Ct., Boulder Creek, CA (US) 95006-9203

(*) Notice: Subject to any disclaimer, the term of this patent is extended or adjusted under 35 U.S.C. 154(b) by 0 days.

(21) Appl. No.: 09/643,139

(22) Filed: Aug. 21, 2000

(51) Int. Cl.$^7$ .................................................. B60P 7/16
(52) U.S. Cl. ...................................... 410/119; 410/125
(58) Field of Search ................................. 410/118, 119, 410/121, 125, 128; 206/522, 593; 383/25

(56) References Cited

U.S. PATENT DOCUMENTS

| | | | |
|---|---|---|---|
| 2,764,750 A | * 10/1956 | Finnell | 410/119 |
| 2,960,942 A | * 11/1960 | Pier et al. | 410/119 |
| 3,131,648 A | * 5/1964 | Seger | 410/119 |
| 3,145,853 A | * 8/1964 | Langenberg | 410/125 X |
| 3,160,118 A | * 12/1964 | Newell | 410/119 |
| 3,199,689 A | * 8/1965 | Feldkamp | 410/119 |
| 3,303,518 A | 2/1967 | Ingram | |
| 3,514,151 A | * 5/1970 | Hacker | 410/119 X |
| 3,722,429 A | * 3/1973 | Holt et al. | 410/125 |
| 3,762,580 A | * 10/1973 | Melsek | 410/119 |
| 3,872,525 A | 3/1975 | Lea et al. | |
| 3,877,092 A | 4/1975 | Gaiser | |
| 3,915,096 A | * 10/1975 | Salisbury | 410/125 |
| RE28,788 E | 4/1976 | Williamson, III | |
| 4,078,842 A | 3/1978 | Zur | |
| 4,168,667 A | 9/1979 | Loomis | |
| 4,224,706 A | 9/1980 | Young et al. | |
| 4,306,322 A | 12/1981 | Young et al. | |
| 4,368,902 A | 1/1983 | McDowell | |
| 4,394,784 A | 7/1983 | Swenson et al. | |
| 4,566,831 A | * 1/1986 | Groth | 410/119 X |
| 4,679,264 A | 7/1987 | Mollura | |
| 4,686,722 A | 8/1987 | Swart | |
| 4,694,520 A | 9/1987 | Paul et al. | |
| 4,711,275 A | 12/1987 | Ford et al. | |
| 4,781,498 A | 11/1988 | Cox | 410/118 |
| 4,836,096 A | 6/1989 | Avery | |
| 4,918,904 A | 4/1990 | Pharo | |
| 4,969,312 A | 11/1990 | Pivert et al. | |
| 5,056,558 A | * 10/1991 | Rodgers | 410/119 X |
| 5,090,856 A | 2/1992 | Moore | 410/118 |
| 5,142,717 A | 9/1992 | Everard et al. | |
| 5,348,157 A | 9/1994 | Pozzo | |
| 5,351,829 A | 10/1994 | Batsford | |
| 5,458,447 A | 10/1995 | Clason | 410/100 |
| 5,676,509 A | * 10/1997 | Enzu | 410/119 |
| 5,678,969 A | 10/1997 | Farrell et al. | 410/119 |
| 5,730,564 A | 3/1998 | Howlett, Jr. | 410/119 |
| 5,803,263 A | 9/1998 | Pozzo | |
| 5,833,413 A | 11/1998 | Cornelius | 410/119 |
| 6,017,175 A | 1/2000 | Kassab et al. | 410/131 |

FOREIGN PATENT DOCUMENTS

DE            1235806       *  3/1967  ................. 410/125

* cited by examiner

*Primary Examiner*—Stephen T. Gordon
(74) *Attorney, Agent, or Firm*—Gerald E. Linden

(57) ABSTRACT

An improved load restraint system and method for protecting and supporting loads, such as cargo, especially during transit movement. The load restraint system and method compensates for various attitude, altitude and ambient pressure changes while maintaining sufficient restraining supportive force on the cargo. One embodiment maintains ambient pressure sensing with pressure/volume fluid compensation to an inflatable bladder responsive to ambient pressure changes within the cargo container. Another embodiment permits inflation of a rigidifying bladder to provide in-situ rigid support for the cargo, included during ambient pressure changes within the cargo container.

20 Claims, 2 Drawing Sheets

LOAD RESTRAINT SYSTEM AND METHOD

BACKGROUND OF THE INVENTION

1. Field of the Invention

This invention relates to load restraining and protecting devices, and more particularly to an inflatable load restraining and protecting device capable of operating in changing ambient pressure conditions.

2. Description of the Prior Art

Various cargo and more generally, load protecting devices have been proposed and implemented to protect articles and packages being shipped and transported. Early examples include cartons, small Styrofoam pieces typically referred to as "popcorn" packed inside shipping boxes, soft and hard molded Styrofoam, and plastic sheets filled with air pockets commonly known as "bubble wrap". Such packing products are difficult to dispose of and do not readily decompose, resulting in environmental problems. Further, such products are rather time consuming to use, difficult to reuse, and not particularly effective as cargo, such as packages, can shift, fall and crush into other packages and damage both the outer packaging and the inner contents, especially during cargo load shifting during cargo transport. Significant efforts have been focused on solving such problems. For example, U.S. Pat. No. 5,351,829 teaches the use of a plurality of air inflatable components shaped to fit the corners of articles and U.S. Pat. No. 4,918,904 teaches an inflatable pocket having air chambers which are designed to envelop and protect articles contained within the pocket. U.S. Pat. Nos. 4,969,312, 5,803,263, and 5,348,157 disclose inflatable structures inside a container forming an inflatable cushion for coming into close contact with an article to be packaged.

Another genre of load and cargo protecting devices is seen in U.S. Pat. No. 3,782,758 (RE 28,788) where a load retainer utilizes a horizontal rod along which a sheet of material may be moved fore and aft in the container as desired. A similar device is seen in U.S. Pat. No. 4,781,498 showing an adjustable partition for use inside of a transport vehicle.

Another type of cargo or load protecting device is seen in U.S. Pat. No. 5,458,447 where a restraining device for vehicular transport comprises a lattice webbing of straps attached to one another with a plurality of self locking buckles and flat hooks for use in vehicles to restrain cargo loads.

For traditional air inflatable load (such as cargo) cushioning or protecting devices, air bladders can be considered. Generally, pressure bladder systems can be noted in the art of air mattresses. A long-standing problem in air mattress design involves the ability to maintain constant pressure within the air mattress in spite of varying loads on the mattress as one or more users sit or lie on the bed, toss and turn during sleep or arise and return to bed. The "feel" of the mattress to the user is considered to be directly related to the amount of air pressure within the mattress. Thus, in an air mattress into which air is drawn to a certain pressure and then sealed, such as those shown in U.S. Pat. Nos. 3,872,525 and 3,877,092, the internal pressure increases when a user lies thereon and the mattress thus "feels" harder as the load thereon increases.

U.S. Pat. Nos. 4,224,706 and 4,306,322 disclose air mattress systems which allow the firmness of the mattress to be controlled when a person is lying thereon through the use of a separate bladder which contains a quantity of air adapted to be transferred between the air mattress and the bladder responsive to changes in the volume of the bladder.

Also known are manually operated air mattress systems, such as that shown in U.S. Pat. No. 4,394,784, where air is supplied to a mattress by a blower or vented from the mattress through valves, both the blower and the valves being electronically controlled by hand-held control units. U.S. Pat. No. 4,078,842 discloses an inflatable auto seat wherein pressurized air is supplied by a manually operated compressor. U.S. Pat. No. 3,303,518 discloses an inflatable mattress wherein air is supplied to compartments therein by hoses connected to a remotely located compressor/pump controlled by the user.

U.S. Pat. No. 4,686,722 discloses a mattress formed from a plurality of individual cushions interconnected by ducting to an air pressure source. The pressure in selected cushions may be controlled by computer. U.S. Pat. No. 4,694,520 discloses an air mattress which includes a sensor positioned within the mattress which turns on an air compressor when the mattress deflates to a point where a patient comes in contact therewith. U.S. Pat. No. 4,711,275 discloses a mattress including a rather complex system having a plurality of air compressors and pressure sensors to inflate and deflate portions of the mattress in cycle to prevent bedsores on a bedridden patient.

U.S. Pat. No. 4,679,264 discloses a self-regulating air mattress including a reservoir and means for adding or removing air from the system. A sensing device is disclosed which is adapted to sense the pressure in the mattress and add or remove air therefrom to maintain a constant pressure. Experimentation has shown, however, that such a system, supposedly designed to maintain pressure within a mattress at a predetermined level by sensing pressure and adding or removing air from the mattress in response to a change in pressure, simply does not work to provide effective load support. The problem of such systems is that, assuming a preset pressure to be sensed and maintained, the pressure within the mattress is increased when a load is placed thereon. This increased pressure is sensed and air is vented from the mattress in response thereto. However, venting of air from the mattress does not decrease pressure within the mattress so long as the load remains thereon until the mattress is almost totally deflated.

Inflation indicators for providing a visual indication of when an air bag is in a properly inflated condition are shown in U.S. Pat. Nos. 5,678,969 and 5,730,564. A cargo load dividing apparatus is disclosed in U.S. Pat. No. 6,017,175.

Finally, a combination lattice web and air pressure bladder inflatable cargo load lock is disclosed in U.S. Pat. No. 5,833,413. This prior inflatable cargo load lock includes an air pressure control unit which allows for pressure adjustments responsive to load, temperature and atmospheric changes. More specifically, the air pressure control unit is designed so as to keep a constant pressure in the bladder and on the load being locked. Such design is insufficient in that, similar to the mattress described above, a shifting load which lies on or leans on the bladder will increase the pressure in the bladder. The disclosed air pressure control unit must therefore remove air from the bladder, decreasing bladder volume, to maintain a constant pressure in the bladder and on the load being locked. Ultimately, the bladder may become substantially deflated (having smaller volume with constant pressure both within the bladder and on the lying or leaning cargo) and the cargo, or portions of the cargo, substantially shifted from its initial and intended position(s). More effective, and part of the instant invention, is recognition that maintaining bladder volume at a sufficient restraining force transmitting position respective to the load is essential to provide stable load restraint.

Accordingly, it is a preferred object of this invention to provide an improved load restraint system for limiting movement of a load within a container, using an inflatable bladder which exerts restraining force against the load to restrict unwanted movement.

An additional object of the invention is an improved load restraint system that retains the bladder in essentially constant inflated volume, and under sufficient pressure, to restrain the load when ambient pressure in the container varies.

A further object of the invention includes a web disposed between the bladder and the load to protect the bladder against rupture and/or additionally support the load. Such web may also act as a threshold emergency support for the load if the bladder critically fails.

Another object of the invention includes a web secured within the container and disposed against the bladder remote from its contact with the load to effectively reduce the volume of the container that the inflated bladder must fill to contact the load with restraining force.

Yet another object of the invention includes inflation of the bladder with various fluids having useful properties (such as temperature control) or which may rigidify to form in-situ a structurally rigid load support structure.

Another object of the invention includes the positioning of shaped and/or multiple bladders within the container to provide load support, as for irregularly shaped loads, or as for multiple direction movement force restraint.

A further object of the invention is to provide rapid bladder evacuation capability to permit deflation or partial deflation, as for repositioning or removal of the bladder for access to the load.

These and other objects and advantages of the invention will become apparent in the description and the claims.

BRIEF DESCRIPTIONS OF FIGURES

Other aspects and advantages of the present invention appear more clearly from reading the following detailed description of the preferred embodiments of the invention, given by the way of example and made with reference to the accompanying drawings, in which.

DESCRIPTION OF THE PREFERRED EMBODIMENT

Figure 1:
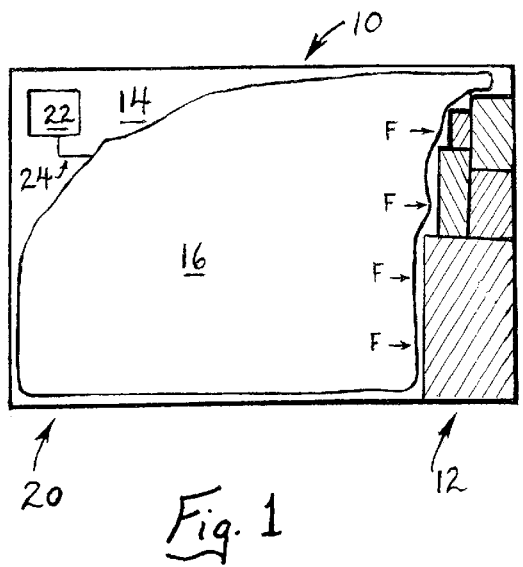
FIG. 1 is a vertical side section view of a preferred mode of the present invention in operation.

Referring now to the figures, wherein like numbers refer to like objects, and referring more particularly to FIG. 1, a container 10 is shown. Such container 10 can be of any shape or size for holding or partially holding various loads, described as cargo 12 articles. Example containers include product boxes, cargo truck bays, shipping containers of many sorts including those for storage in a truck, train, car, airplane, ship, submarine or other transportation vehicle. Example cargo includes any article or container which may be placed within or partially within a container 10. Such cargo 12 is shown in the figures as multiple or singular rectangular (or cubic) articles, but may be of any shape and from one to many articles contacting each other or separated from each other within or partially within the container 10.

The container 10 has an interior 14 where the cargo 12 resides at least partially, but preferably completely within. The interior 14 is usually of a volume that exceeds the combined volume of the cargo 12 article(s). Thus, especially during movement of the container 10 (as by moving a container transport vehicle) the cargo 12 article(s) may be subject to forces that could displace the initial positions of the cargo 12 article(s) resulting in crushing, shocks, shifting or other forces which may provide potential damage to the cargo 12 article(s).

To minimize or alleviate the potential shifting or displacement of the cargo 12 article(s), and it's resulting damage, an improved load restraint system of the present invention is disclosed generally in FIG. 1 at 20. The restraint system 20 includes an inflatable bladder 16 element located essentially within the interior 14 of the container 10. The bladder 16 is shown wholly within the interior 14 of the container 10 but may extend out of the container 10 (not shown) especially when portions of cargo 12 may extend out of the container 10. The bladder 16 can be inflated as by inserting a fluid into the bladder 16 under control of a controller 22 connected to the bladder 16 by a connector 24. The controller 22 and associated connector 24 being parts of an inflator (usually including a deflator) for the load restraint system 20. While any effective fluid may be used, most commonly the bladder 16 will be inflated by compressed air or other gas usually supplied from a pump, tank, reservoir or other source through a tube or valve into the bladder 16. Alternatively, specialized fluids such as fire retardant, energy (such as light, heat or electricity) insulating or conducting and/or controlled fluids (such as heated or chilled fluids) or others may be used. Also, various viscous or semi-solid fluids such as gels or putties may be used to provide a less malleable inflated bladder 16. Also contemplated are fluids or combinations of fluids which may partially or fully solidify in situ, forming a rigid bladder 16, such as would be achieved by spraying the (usually interior) surface of an air-inflated bladder 16 with resin and hardener, or by inflating the bladder 16 with cement or concrete. Also contemplated are fluids which may transform from solid to liquid or liquid to solid within the bladder for the purpose of allowing or disallowing specified shifting to occur and/or limit/restrain cargo shifting under predefined conditions such as heating a solidified (i.e., ice) filled bladder 16 to a specified temperature at which point the filling material re-liquefies (for example to water) for deflation or partial deflation, as for cargo repositioning. More generally, at times of bladder inflation, the inflation fluids are essentially generally compressible gas (air, vapor, etc.) or incompressible fluid (water, gel, cement, etc.) whether or not containing solids (such as sols, air with resin crystals or concrete, etc.).

The bladder 16 should be inflated to a sufficient volume and pressure to exert restraining force F on the cargo 12. The force should be sufficient to help maintain the cargo 12 in position and restrain the cargo 12 from shifting due to dislocating forces on the cargo 12 (generally transmitted by movement of the container 10). Such dislocating forces could include acceleration of the container 10 and cargo 12 as by movement initiation or speed change or angular elevation (attitude) change or rotation of the container 10 or vehicles containing the container 10. For example, should the container 10 of FIG. 1 be subjected to an acceleration change toward the right of the diagram or a counter clockwise angular acceleration, the force F (as shown) exerted by the pressurized bladder 16 on the cargo 12 would inhibit or at least minimize the shifting of the cargo 12 leftwards.

Figure 2A:
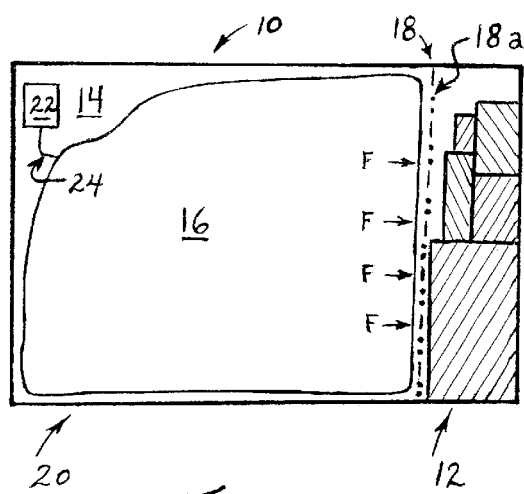
FIGS. 2a, 2b and 2c are vertical side section views, similar to FIG. 1, of additional preferred modes of the present invention.
Figure 2B:
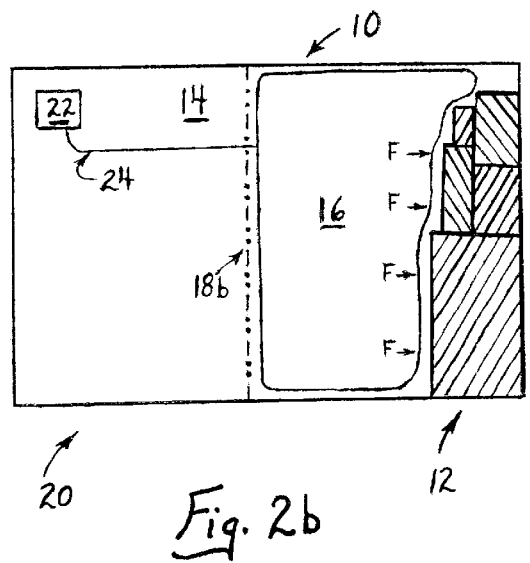
Figure 2C:
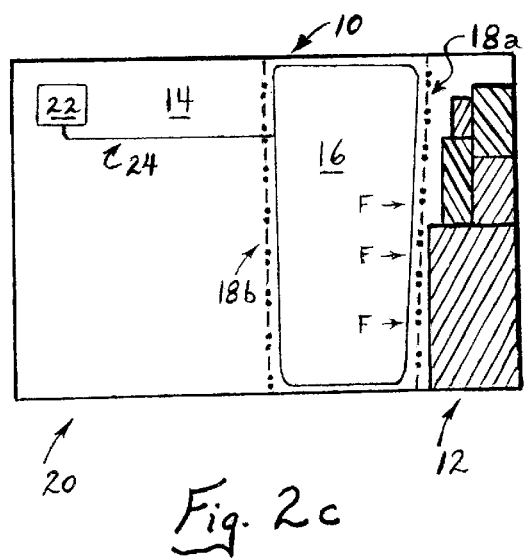

The bladder 16 may contact the cargo 12 directly or provide force F through a web 18 shown in FIGS. 2a at 18a (or otherwise indirectly through other cargo or separators). Web 18a is shown as being secured to the container 10 to provide additional cargo 12 restraint force as well as to protect the surface of the bladder 16, as from punctures. Alternatively, or in combination, the web or puncture resistant material may be attached to or incorporated directly onto the cargo 12 contacting portion of the bladder 16. Alternatively, or in combination, the web 18 may be unsecured and placed or positioned between a portion of the bladder 16 and at least a portion of the cargo 12 as shown at 18d in FIG. 3b.

The web may be of any material such as cloth or screening or an interlaced strapping depending on the size of the cargo 12 items and the puncture or tear resistance and the potential additional support desired. A secured web may also act as an emergency support for the load if the bladder critically fails, as well as providing additional load support in conjunction with the bladder. One or more webs of different materials or combinations of materials in flexible semi-rigid and rigid/stiff structure and flat, shaped, contoured, and patterned versions are contemplated.

Most preferably, the web(s) 18 will be removably secured to portions of the container 10 walls or to a rod or frame (not shown) within the interior 14 of the container 10. By securing a web 18 within the container 10 between the bladder 16 and cargo 12, as shown at 18a in FIGS. 2a, 2c, 3a and 5 both protective and additional restraint benefits can be achieved in combination with the inflated bladder 16, as well as some load restraint in the event of a critical failure (deflation) of the bladder(s). The web 18 removably secured between the bladder 16 and cargo 12 or between groups of cargo (as shown at 18h in FIG. 3b) or located, positioned or placed without securing (as shown at 18d in FIG. 3b) may additionally provide a movable partition to separate cargo groupings as for different recipients or delivery locations. Also, such web(s) may more evenly distribute force F over the cargo 12. One or more different web types and configurations, whether secured or unsecured, may be used.

Figure 3A:
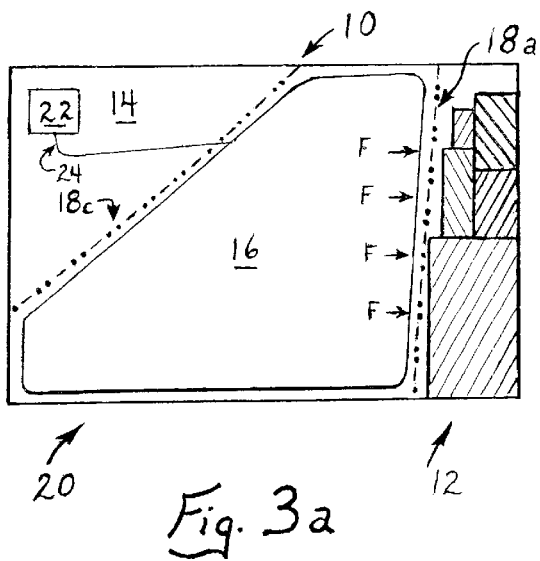
FIGS. 3a and 3b are vertical side section views, similar to FIG. 1, of further preferred modes of the present invention.
Figure 3B:
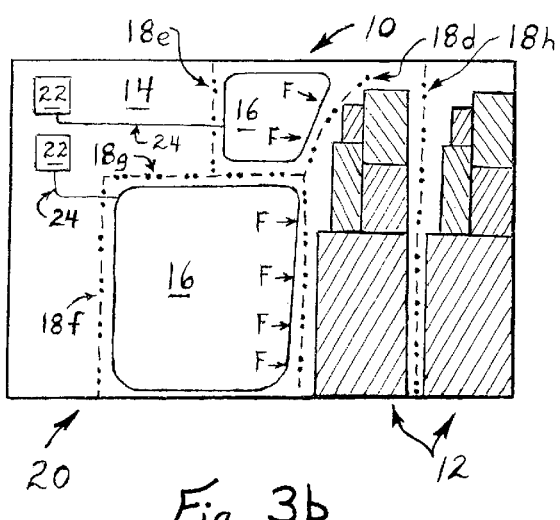

One or more webs may also be secured remote from cargo 12 in relation to the bladder 16, as shown at 18b in FIGS. 2b, 2c and 5, 18c in FIG. 3a and at 18e, 18f and 18g in FIG. 3b. The primary benefit for securing a web 18 in position remote from the cargo 12 is to effectively reduce the size of the interior 14 of the container 10 that must be filled with the inflated bladder 16 to provide restraining force F on the cargo 12. More generally, the web(s) may be positioned (secured or unsecured) between a portion of the bladder(s) 16 and at least a portion of the cargo 12 or remotely from the surface of the bladder(s) 16 that contact the cargo 12 articles (as shown at 18c in FIG. 3a, 18e and 18f and most of 18g in FIG. 3b and at 18b in FIGS. 2b, 2c and 5).

Figure 4:
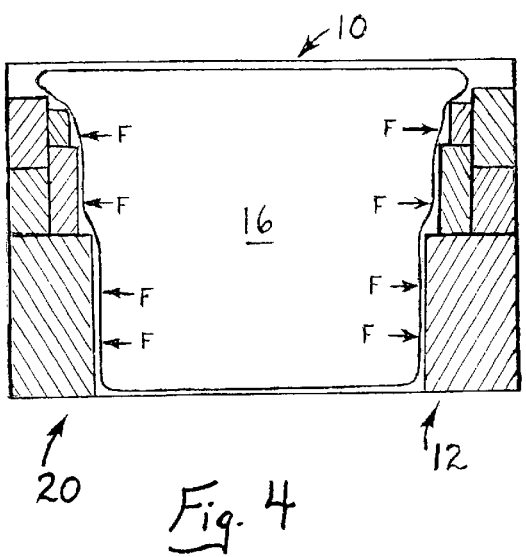
FIG. 4 is a vertical side section view, similar to FIG. 1, of an additional preferred mode of the present invention.
Figure 5:
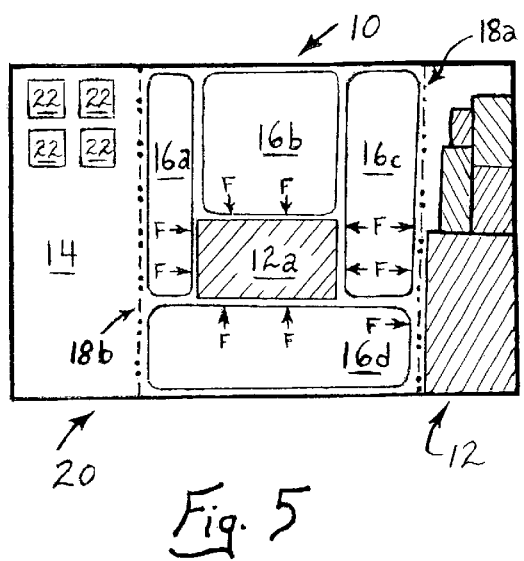
FIG. 5 is a vertical side section view, similar to FIG. 1, of yet another preferred mode of the present invention.

The web(s) need not be secured or placed in essentially vertical or horizontal or parallel relationships, but may be at angles (as shown at 18c in FIG. 3a) or intersecting (as shown at 18g in FIG. 3b) and overlapping positions or skewed positions (as shown at unsecured web 18d overlying a portion of cargo 12 in relation to the other webs 18e, 18f, 18g and 18h) and not always in essentially a straight or linear position (as shown in FIG. 3b) as well as other complex positions. Additionally, multiple bladders may be used in conjunction or combination as shown in FIGS. 3b and 5. Also, one or more bladders may be used to support multiples groups of cargo 12 as shown in FIGS. 3b, 4 and 5.

Returning now to FIG. 1 and with reference to the other figures, the restraint system 20 is provided with a controller 22. While the figures (except FIG. 4 where the controller 22 and connector 24 are not shown for clarity of the diagram, and to note that controller 22 and/or the connector 24 or any part(s) including the entirety of the bladder inflator and/or deflator may lie fully or partially outside of the interior 14 of the container 10) show one controller 22 for each bladder 16 and each controller 22 associated with one connector 24 for each bladder 16 (FIG. 5 does not show connectors 24 for clarity of the diagram) in fact, one controller 22 could control multiple bladders 16, inflating (and/or deflating) the bladders and keeping a uniform pressure for the multiple bladders (both in FIG. 3b, two or more in FIG. 5). Alternatively, one controller 22 could control multiple bladders 16 as by selectively switching control between each bladder to be inflated, deflated or otherwise controlled or keeping multiple bladders equally pressurized. Also, alternatively, one controller 22 could effectively control multiple bladders as by increasing or decreasing pressure or volume on a directly controlled bladder with indirect pressure and volume variation resulting in neighboring or associated bladders. Such indirect pressure and volume controls could be achieved as shown in FIG. 5 as by pressure control by a controller 22 directly increasing pressure and volume of a bladder 16a which would exert indirect pressure increase (or volume decrease if pressure did not increase) in bladders 16b and/or 16d and more indirectly to bladder 16c depending on whether bladders 16b, 16c and/or 16d were deflated to compensate for direct increases in volume or pressure of bladder 16a. This indirect pressure and volume effect can be minimized or neglected by placement of one or more fixed or secured separators between bladders as shown in FIG. 3b with web 18g secured between the two bladders 16. If the separator is sufficiently inflexible and immobile, pressure and volume variations of one bladder will not be essentially transmitted to adjacent or other bladders.

Multiple bladders, as bladders 16a, 16b, 16c and 16d in FIG. 5, may be used to completely surround or more fully surround cargo, as cargo 12a. As should be obvious to one of skill in the art, any number of bladders or shaped and contoured bladders conforming or partially conforming to the surface of the cargo may be used. While the figures show two dimensional bladders, the remaining sides (as for six face or sides of a cube, not shown) of cargo 12 may also be protected by bladders as well as front, top, back, and bottom protection (as by 16c, 16b, 16a and 16d respectively protecting cargo 12a as shown in FIG. 5).

So long as one pressure and/or volume inflated bladder directly or indirectly transmits a sufficient securing or protective force F to at least a portion of cargo (as through direct contact or indirectly through another bladder, a web, a spacer or another piece of cargo) the essential invention is encompassed. Thus, so long as sufficient force F is transmitted to the cargo, directly or indirectly, it will be defined as having at least a portion of the surface of the bladder contacting at least a portion of the cargo or load, or providing a force transmitting contact, whether direct physical contact exists or not.

A primary feature of the invention is the control of the volume with a pressure or rigidity of the bladder(s) to an initial force F transmitting position and then retention of the bladder volume with force F transmission regardless of ambient pressure change in the container. Thus, while the bladder(s) of the present invention should be inflated sufficiently to exert force F directly or indirectly on at least a portion of the cargo to inhibit undesirable movement, prior load restraint systems have failed this goal especially when ambient pressure within the container interior varies.

For example, a cargo container transported to a substantially higher altitude after cargo loading and initial bladder inflation would effect lower pressure on the fluid (usually air) within the interior 14 of the container 10 compared to the initial ambient pressure in the container 10 during bladder inflation. Even if the interior 14 is evacuated or there is no gap between the bladder and rigid, semi-rigid or secured supporting surfaces, (such as container walls or secured webs) higher altitude change would decrease ambient pressure in the container 10, acting to increase the effective volume of the air bladder (absent rigid or secured restraints) permitting possible over-pressure of the bladder and increased force F on the cargo. More disastrous would be the lowering of altitude of the container 10 with a resultant increase in ambient (usually air) pressure in the interior 14 of the container 10 from initial ambient pressure during bladder inflation, effectively reducing the volume of the bladder(s) for any uncompensated pressure. With a reduced volume, the bladder(s) may no longer contact (directly or indirectly) the cargo to transmit force F to secure the cargo 12 against undesirable movement, thereby causing failure of the load restraint system.

Therefore the present invention includes ambient pressure compensation to keep one or more of the bladder(s) in direct or indirect force transmitting contact or capability with at least a portion of the cargo 12. One means to achieve such pressure compensation would include an ambient pressure sensor (usually associated with, and as a part of controller 22, connector 24, or attached within the interior 14 of the container) that would sense ambient pressure in the interior 14 of the container 10 and increase or decrease the volume of fluid (e.g. from a reservoir, tank or pump) in one or more bladder(s) to maintain sufficient pressure and volume such that one or more bladder(s) would continue to transmit force F to at least a portion of the cargo. As the ambient pressure varies from its initial (during cargo loading) ambient pressure within the container the bladder is inflated or deflated (increasing or decreasing pressure/volume of the fluid in the bladder) to compensate for the new initial (at a point in time during transit for example) ambient pressure within the container.

Alternatively to using an ambient pressure sensor(s), barometric gauges or sensors could be used to measure altitude and/or strain gauges or sensors could be used on the surface of an expandable section of bladder skin associated with (usually calculated) indices relating to effective volume and pressure of one or more bladders. More directly, force gauges or sensors of any appropriate type may be used between the bladder(s) and cargo (or between two locations affected by force F) to measure effective force F with the controller(s) 22 activated to increase or decrease the fluid in the bladder(s) in order to increase or decrease, respectively, the force F exerted directly or indirectly on the cargo. Any means for determining ambient pressure change within the container, changes on objects within the container, or force F change is acceptable to initiate volume/pressure compensation to the bladder(s) to continue exertion of sufficient force F on the cargo.

Thus, problematic are the differential of pressure between the initial (at any time) ambient pressure within the interior of the container and the usually higher pressured fluid in the bladder to maintain an inflated, load restraining bladder.

Should pressure increase in the interior of the container, with an uncompensated (non-rigid) bladder pressure, the bladder volume will reduce to the point that it may cease exerting restraining force F on the load (such as cargo). Similarly, if the fluid pressure in the bladder changes (as by osmosis through the bladder skin surface or by temperature variation) as compared to the prior initial ambient pressure within the container, either too much force F or, more critically, too little force F will be transmitted to the load. Even if the actual ambient pressure may not change, or change to a minor degree, the differential or degree of difference between the bladder fluid pressure and the container interior ambient pressure from any initial pressure(s) is important. Should the volume of the bladder decrease, whether due to absolute ambient pressure change, temperature change, loss of fluid from the bladder or other means which reduces the force F or excessively increases the force F, such will be defined herein as being due to a variation of ambient pressure within the container.

The bladder should retain load contact after initial inflation to restrain the load against movement. Should force sensors be used to determine force F exerted by the bladder(s) additional inflation or deflation (as a dynamic force compensator) may be utilized (as through controller 22 and connector 24) to maintain force F regardless of consideration of ambient pressure, temperature or other change within the container. Force measurement or other direct measurement of the bladder, would also permit a monitoring (including alarm) should the bladder critically fail as by bursting or tearing.

An alternative ambient pressure compensation system of the present invention would exist by inflating the bladder to a force F exerting position and rigidifying the bladder in position. Such a rigid bladder could be achieved as by filling the bladder with a solidifying fluid (such as cement, concrete or solidifying foam or by coating the surface of the bladder with a rigidifying material such as a resin sprayed onto the (usually inner) surface of the bladder before, during or after the (pressurizing) inflation. Another rigid bladder could be achieved by temperature control, as by freezing the inflating fluid (such as water) into a solid (ice) which could be later melted for partial or total deflation of the bladder while providing additional (refrigeration) benefit to the cargo. Also contemplated are inflation of the bladder with high viscosity fluids, such as putty, or fluids or combinations that become highly viscous enough to continue to exert force F on at least a portion of the cargo during ambient pressure change in the container; for the context of the present invention, a sufficiently high viscosity fluid whether initially inserted into the bladder or becoming sufficiently viscous after insertion into the bladder shall be defined as becoming rigid. So long as the strength and the rigidity of the rigidified bladder is sufficient, the rigid bladder would continue to exert sufficient force F on the cargo to restrain its undesirable movement, even during periods of ambient pressure change in the interior 14 of the container 10, and generally regardless of the pressure within the bladder after rigidification, thus being a dynamic force compensator.

After the cargo no longer needed support or protection, for example after transport, the bladder could be removed or, if not strongly rigid, deflated as by a valve, pump, venturi system, combination or other means associated with the bladder 16, controller 22 or connector 24 which would rapidly deflate (fully or partially) the bladder for removal or re-positioning.

Additional advantages and modifications will occur to those of skill in the art without departing from the scope of the invention presented.

I claim:

1. An improved load restraint apparatus for restraining movement of a load within a container, comprising:

an inflatable bladder substantially containable within said container, an inflator for inflating said bladder sufficiently to exert force against at least a portion of said load within said container to restrain said load against movement, and means for retaining the bladder at an essentially constant inflated volume, and under sufficient pressure, to restrain the load against movement.

2. The apparatus of claim 1, wherein the means for retaining the bladder is selected from the group consisting of ambient pressure compensator, barometric gauges or sensors, and strain gauges or sensors on a surface of an expandable section of the bladder.

3. The apparatus of claim 1, including a web positionable within said container between at least a portion of said bladder and said portion of said load such that said force is transmitted from said bladder through said web to said portion of said load.

4. The apparatus of claim 1, including a web securable to a portion of said container remote from said load to minimize an effective volume of said container.

5. The apparatus of claim 1, wherein the inflator injects a fluid into said bladder to inflate said bladder.

6. The apparatus of claim 5 wherein said fluid contains solids.

7. The apparatus of claim 5, wherein said fluid is a compressible gas.

8. The apparatus of claim 5, wherein said fluid is an incompressible liquid.

9. The apparatus of claim 1, wherein the bladder is inflated with a material selected from the group consisting of cement, concrete, solidifying foam, water and putty.

10. The apparatus of claim 1, wherein a surface of the bladder is coated with a rigidifying material.

11. The apparatus of claim 1, wherein at least a portion of said bladder becomes rigid after inflation of said bladder.

12. The apparatus of claim 1 further comprising a deflator for deflating said bladder.

13. The apparatus of claim 5, wherein at least a portion of said fluid becomes rigid after inflation of said bladder.

14. An improved load restraint apparatus for restraining movement of a load within a container, comprising:

at least two inflatable bladders substantially containable within said container, at least one inflator for inflating said at least two bladders sufficiently to exert force against at least a portion of said load within said container to restrain said load against movement, and means for retaining the at least two bladders at an essentially constant inflated volume, and under sufficient pressure, to restrain the load against movement, wherein the at least two bladders are separate from one another.

15. The apparatus of claim 14, wherein said at least one inflator comprises two inflators, a selected one of the two inflators is associated with a selected one of the at least two bladders, and a selected other of the two inflators is associated with a selected other of the at least two bladders.

16. The apparatus of claim 14, wherein the bladders are separated from one another by at least one separator and the at least one separator is sufficiently inflexible and immobile that pressure and volume variations of one bladder will not be essentially transmitted to an adjacent or other bladder.

17. The apparatus of claim 14, wherein the bladders surround corresponding at least two sides of the load.

18. An improved load restraint for restricting movement of a load within a container, comprising:

an inflatable bladder at least a portion of which is positionable within said container, an inflator for inflating said bladder to exert restraining force against at least a portion of said load within said container, and a dynamic force compensator for maintaining essentially constant a volume of said bladder responsive to force changes against said portion of said load.

19. The apparatus of claim 18, including a web securable to a portion of said container remote from said load to minimize an effective volume of said container.

20. The apparatus of claim 18, including a web positionable within said container between at least a portion of said bladder and said portion of said load such that said restraining force is transmitted from said bladder through said web to said portion of said load.

* * * * *